(12) United States Patent
Dominguez

(10) Patent No.: US 11,757,339 B2
(45) Date of Patent: Sep. 12, 2023

(54) ELECTRICALLY DRIVEN POWER END APPARATUS AND METHODS

(71) Applicant: FORUM US, INC., Houston, TX (US)

(72) Inventor: Saul Dominguez, Mansfield, TX (US)

(73) Assignee: FORUM US, INC., Houston, TX (US)

( * ) Notice: Subject to any disclaimer, the term of this patent is extended or adjusted under 35 U.S.C. 154(b) by 346 days.

(21) Appl. No.: 17/166,706

(22) Filed: Feb. 3, 2021

(65) Prior Publication Data
US 2021/0246889 A1     Aug. 12, 2021

Related U.S. Application Data

(60) Provisional application No. 62/975,432, filed on Feb. 12, 2020.

(51) Int. Cl.
| | |
|---|---|
| *H02K 21/28* | (2006.01) |
| *F04B 17/03* | (2006.01) |
| *H02K 7/075* | (2006.01) |
| *H02K 7/12* | (2006.01) |
| *H02K 7/14* | (2006.01) |
| *E21B 43/26* | (2006.01) |

(52) U.S. Cl.
CPC ............ *H02K 21/28* (2013.01); *F04B 17/03* (2013.01); *H02K 7/075* (2013.01); *H02K 7/12* (2013.01); *H02K 7/14* (2013.01); *E21B 43/2607* (2020.05)

(58) Field of Classification Search
CPC .......... H02K 21/28; H02K 7/075; H02K 7/12; F04B 17/03
See application file for complete search history.

(56) References Cited

U.S. PATENT DOCUMENTS

| | | | |
|---|---|---|---|
| 9,534,473 B2 | 1/2017 | Morris et al. | |
| 9,562,420 B2 | 2/2017 | Morris et al. | |
| 10,284,040 B1 * | 5/2019 | Craddock | ............... H02K 1/12 |

(Continued)

FOREIGN PATENT DOCUMENTS

| | | |
|---|---|---|
| CN | 104373317 A | 2/2015 |
| JP | H0578161 U | 10/1993 |

(Continued)

OTHER PUBLICATIONS

PCT International Search Report and Written Opinion dated May 4, 2021, for International Application No. PCT/US2021/016410.

(Continued)

*Primary Examiner* — Tulsidas C Patel
*Assistant Examiner* — Mohammed Ahmed Qureshi
(74) *Attorney, Agent, or Firm* — PATTERSON + SHERIDAN, L.L.P.

(57) ABSTRACT

Aspects of the disclosure relate to electrically driven power end apparatus and methods, and associated components thereof. In one implementation, a power end for a pump includes a crankshaft coupled to a plurality of actuation rods, and a motor. The motor includes a rotor coupled to the crankshaft. The rotor includes a plurality of electrical coils wound at least partially around the rotor. The motor includes a stator disposed radially outside the rotor, and the stator includes one or more magnets. The plurality of electrical coils apply a magnetic force to the rotor to turn the crankshaft when the plurality of electrical coils are powered.

20 Claims, 4 Drawing Sheets

(56) References Cited

U.S. PATENT DOCUMENTS

| | | |
|---|---|---|
| 2015/0275891 A1* | 10/2015 | Chong .................. F04B 53/147 |
| | | 417/419 |
| 2016/0359392 A1 | 12/2016 | Mergener et al. |
| 2017/0138150 A1 | 5/2017 | Yencho |
| 2018/0102680 A1* | 4/2018 | Yu ......................... H02K 23/04 |
| 2019/0169971 A1 | 6/2019 | Oehring et al. |

FOREIGN PATENT DOCUMENTS

| | | |
|---|---|---|
| JP | 201290497 A | 5/2012 |
| WO | 9810506 A1 | 3/1998 |
| WO | 2019060922 A1 | 3/2019 |

OTHER PUBLICATIONS

Fraser, Jeff—"The Brave New World of Electric Frac," Oilfield Technology, Apr. 2018, pp. 46-48.

\* cited by examiner

ELECTRICALLY DRIVEN POWER END APPARATUS AND METHODS

CROSS-REFERENCE TO RELATED APPLICATIONS

This application claims benefit of U.S. Provisional Patent Application Ser. No. 62/975,432, filed on Feb. 12, 2020, which is expressly incorporated herein by reference in its entirety.

BACKGROUND

Field

Aspects of the disclosure relate to electrically driven power end apparatus and methods, and associated components thereof. In one example, the electrically driven power end apparatus and methods are used in frac pumps for oil and gas wells.

Description of the Related Art

To hydraulically fracture an oil and gas wellbore, a pump located on the surface is used to pump a highly pressurized frac fluid into the wellbore. A power end is used to drive the pump, and a prime mover is used to drive the power end. Specifically, a prime mover, such as a diesel engine, is used to generate torque that rotates a crankshaft of the power end to help drive the pump. Conventional power ends have multiple complex moving parts that take up a large amount of space, are very heavy, and have high maintenance and assembly costs Therefore, there is a need for new and improved power end apparatus and methods.

SUMMARY

Aspects of the disclosure relate to electrically driven power end apparatus and methods, and associated components thereof. In one example, the electrically driven power end apparatus and methods are used in frac pumps for oil and gas wells.

In one implementation, a power end for a pump includes a crankshaft coupled to a plurality of actuation rods, and a motor. The motor includes a rotor coupled to the crankshaft. The rotor includes a plurality of electrical coils wound at least partially around the rotor. The motor includes a stator disposed radially outside the rotor, and the stator includes one or more magnets. The plurality of electrical coils apply a magnetic force to the rotor to turn the crankshaft when the plurality of electrical coils are powered.

In one implementation, a power end for a pump, includes a crankshaft coupled to a plurality of actuation rods. The power end includes a motor. The motor includes a rotor coupled to the crankshaft. The rotor includes a first portion disposed on a first side of a center of the rotor. The first portion includes a first plurality of electrical coils wound at least partially around the first portion. The rotor includes a second portion disposed on a second side of the center of the rotor. The second portion includes a second plurality of electrical coils wound at least partially around the second portion. The motor includes a stator disposed radially outside of the rotor. The stator includes one or more magnets. The first plurality of electrical coils generate a first magnetic force drawn to at least one of the one or more magnets in a first direction when powered. The second plurality of electrical coils generate a second magnetic force drawn to at least one of the one or more magnets in a second direction when powered. The second direction is opposite of the first direction.

In one implementation, a power end for a pump includes a crankshaft coupled to a plurality of actuation rods. The crankshaft includes a drive shaft. The power end includes a motor. The motor includes a rotor coupled to the drive shaft of the crankshaft. The rotor includes a centerline axis extending through a center of the rotor. The rotor includes a first outer portion disposed on a first side of the center of the rotor, the first outer portion including a first plurality of electrical coils wound at least partially around the first outer portion. The rotor includes a second outer portion disposed on a second side of the center of the rotor, the second outer portion including a second plurality of electrical coils wound at least partially around the second outer portion. The rotor includes a third outer portion disposed on a third side of the center of the rotor, the third outer portion including a third plurality of electrical coils wound at least partially around the third outer portion. The rotor includes a fourth outer portion disposed on a fourth side of the center of the rotor, the fourth outer portion including a fourth plurality of electrical coils wound at least partially around the fourth outer portion. The motor includes a stator disposed radially outside of the rotor relative to the center of the rotor. The stator includes one or more magnets. The first outer portion, the second outer portion, the third outer portion, and the fourth outer portion of the rotor define an inner circumferential perimeter, and the drive shaft defines an outer circumferential perimeter. The outer circumferential perimeter is within the inner circumferential perimeter.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
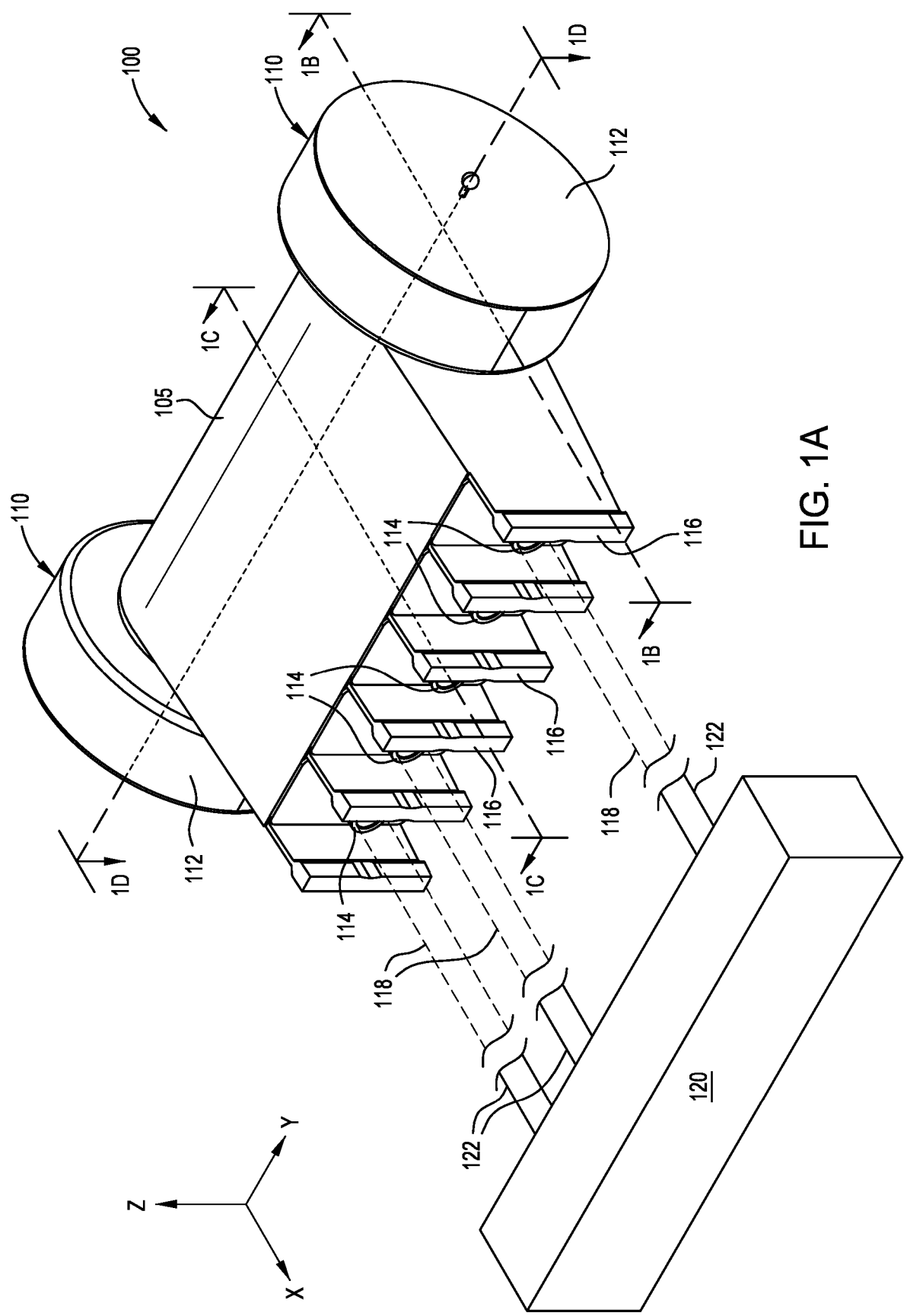
FIG. 1A is a schematic isometric view of a fluid end and a power end, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to electrically driven power end apparatus and methods, and associated components thereof. In one example, the electrically driven power end apparatus and methods are used in frac pumps for oil and gas wells.

FIG. 1A is a schematic isometric illustration of a power end 100 and a fluid end 120, according to one implementation. The fluid end 120 and the power end 100 are operationally coupled to each other through a plurality of pony rods 118 and plungers 122. The power end 100 is configured to move the plurality of pony rods 118 and plungers 122 relative to the fluid end 120 to help pump fluid into and out of the fluid end 120. The power end 100 is disposed in an X-axis, a Y-axis, and a Z-axis that define an X-Y plane, an X-Z plane, and a Y-Z plane.

The power end 100 is an electrically driven power end. The power end 100 includes a power end body 105 and a pair of motors 110 disposed on opposing ends of the power end body 105. Each of the motors 110 includes a motor housing 112. The motor housing 112 may be integrally formed with the power end body 105 to form a single unitary and monolithic body. The present disclosure contemplates that one or more motors 110 (two are shown) may be used for the power end 100.

The power end 100 includes a plurality of actuation rods 114 disposed at least partially outside of the power end body 105. A plurality of dividers 116 are disposed between and outside of the actuation rods 114. The dividers 116 protrude from an outer surface of the power end body 105. The actuation rods 114 may be part of, or coupled to, a plurality of pony rods 118. The pony rods 118 are disposed between, and couple, the power end 100 to the fluid end 120. Each of the pony rods 118 is coupled to one of a plurality of plungers 122 disposed at least partially inside of the fluid end 120. Each of the pony rods 118 may be coupled to one of the plungers 122 through a plunger clamp.

Upon actuation of the actuation rods 114 translationally, the pony rods 118 are actuated to move the plungers 122 of the fluid end 120. Actuating the plungers 122 of the fluid end 120 moves the plungers 122 relative to the fluid end 120 and pressurizes a fluid, such as a frac fluid, to pump the fluid through the fluid end 120. In one example, the fluid is pumped downhole into an oil and gas wellbore, and the fluid end 120 and the power end 100 form part of a frac pump.

The present disclosure contemplates that terms such as "couples," "coupling," "couple," and "coupled" may include welding and/or fastening such as by using clamps, bolts, threaded studs, and/or screws. Terms such as "couples," "coupling," "couple," and "coupled" may include direct or indirect coupling. As an example, the power end 100 may be indirectly coupled to the fluid end 120 through at least the pony rods 118. Unless otherwise specified, the present disclosure contemplates that coupling may be direct or indirect.

Figure 1B:
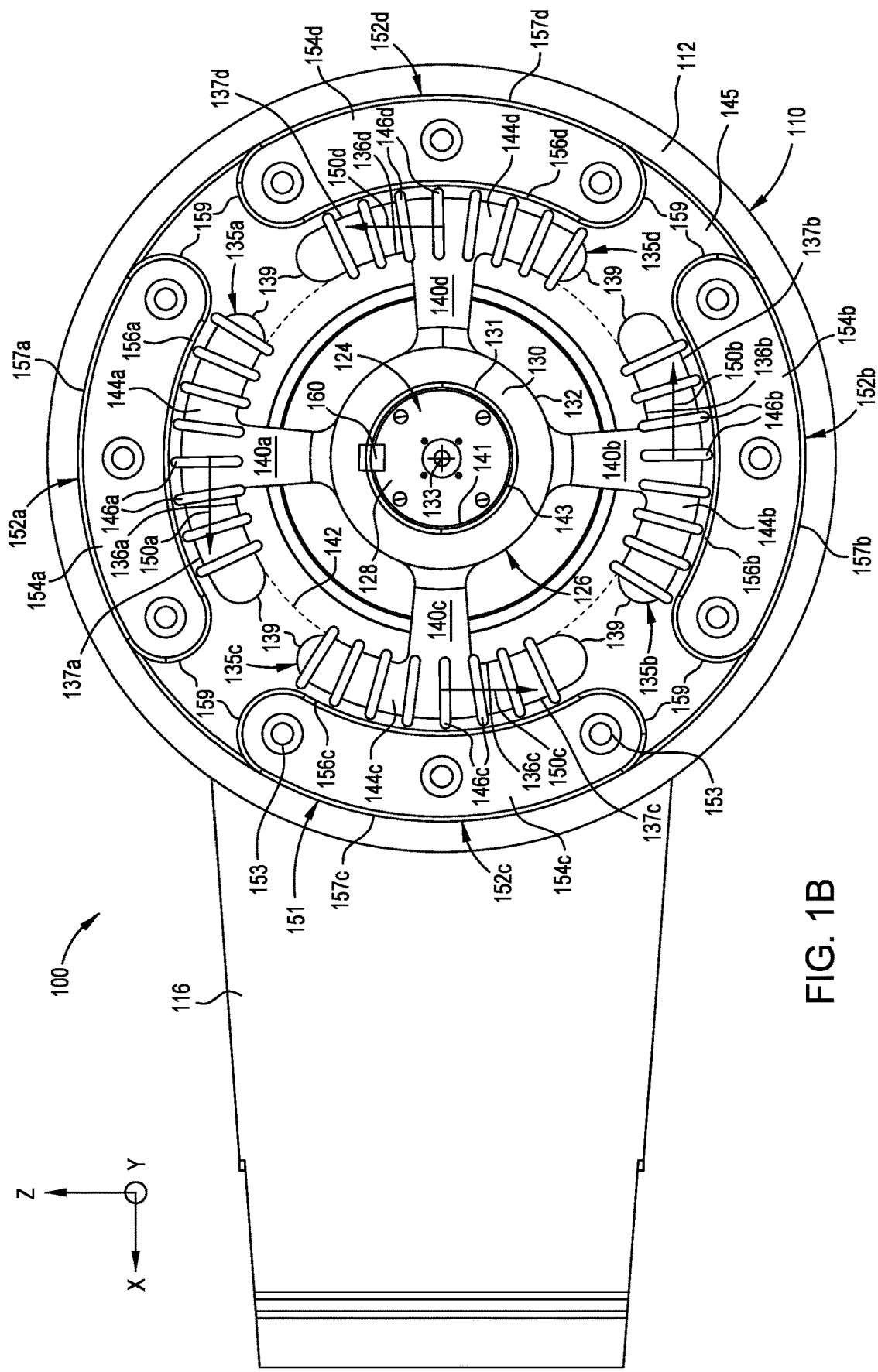
FIG. 1B is a schematic cross sectional view of the power end illustrated in FIG. 1A, taken along lines 1B-1B, according to one implementation.

FIG. 1B is a schematic cross sectional view of the power end 100 illustrated in FIG. 1A, taken along lines 1B-1B, according to one implementation. One of the motors 110 is shown in FIG. 1B. The motor 110 is disposed in the respective motor housing 112. The motor 110 is disposed at an end of a crankshaft 124 of the power end 100. The present disclosure contemplates that motors 110 may be disposed at any location along the length of the crankshaft 124, such as a middle point of the crankshaft 124. The present disclosure contemplates that the motors 110 may be disposed inside of the power end body 105.

The motor 110 includes a rotor 126 coupled to a drive shaft 128 of the crankshaft 124. The drive shaft 128 is a portion of the crankshaft 124. The present disclosure contemplates that drive shaft 128 may be disposed at any location along the length of the crankshaft 124, such as a middle point of the crankshaft 124. The present disclosure contemplates that the drive shaft 128 may be disposed inside of the power end body 105.

The rotor 126 includes a central portion 130 disposed around the drive shaft 128. The central portion 130 is circular in shape and includes a central opening formed therethrough. The central opening of the central portion 130 receives the drive shaft 128. The central portion 130 includes an inner surface 131 and an outer surface 132. The inner surface 131 interfaces with, and contacts, the drive shaft 128 of the crankshaft 124. The rotor 126 includes a centerline axis that extends through a center 133 of the rotor 126. The center 133 is in the X-Z plane. A center of the central opening of the central portion 130 is aligned with the center 133 of the rotor 126. The centerline axis of the rotor 126 extends parallel to the Y-axis.

An outer surface 141 of the drive shaft 128 defines an inner circumferential perimeter 143 in the X-Z plane. The inner circumferential perimeter 143 and the outer circumferential perimeter 142 are circular in shape. The inner circumferential perimeter 143 is within the outer circumferential perimeter 142. The drive shaft 128, a portion of the crankshaft 124, is disposed with the outer circumferential perimeter 142. The outer surface 141 of the drive shaft 128 of the crankshaft 124 contacts the inner surface 131 of the central portion 130 of the rotor 126 at one or more contact locations.

A locking member 160 is disposed between the central portion 130 of the rotor 126 and the drive shaft 128 of the crankshaft 124 to rotationally lock the rotor 126 to the drive shaft 128. The locking member 160 is disposed in an opening that includes a first recess formed in the outer surface 141 of the drive shaft 128 and a second recess formed in the inner surface 131 of the central portion 130. The first recess formed in the outer surface 141 is rotationally aligned with the second recess formed in the inner surface 131. In one example, the locking member 160 is a spline, pin, or other key-type member disposed in one or more of the outer surface 141 and/or the inner surface 131. In one example, the locking member 160 is coupled to one or more of the drive shaft 128 and/or the central portion 130 of the rotor 126. In one example, the locking member 160 is integrally formed as a part of the drive shaft 128 and/or the central portion 130 of the rotor 126.

The rotor 126 includes a first outer portion 135a, a second outer portion 135b, a third outer portion 135c, and a fourth outer portion 135d disposed radially outside of the central portion 130 relative to the center 133. The first through fourth outer portions 135a-135d are disposed in a circumferential fashion about and around the central portion 130 of the rotor 126. The first outer portion 135a is disposed on a first side of the center 133, and the second outer portion 135b is disposed on a second side of the center 133 that opposes the first side. The third outer portion 135c is disposed on a third side of the center 133, and the fourth outer portion 135d is disposed on a fourth side of the center 133 that opposes the third side. Centers of the outer portions 135a-135d are spaced about 90 degrees equidistantly from each other about the center 133, as illustrated in FIG. 1B.

Each of the outer portions 135a-135d is arcuate in shape and disposed concentrically to the central portion 130. In one example, an arcuate profile extending through a center of each one of the outer portions 135a-135d is concentric to a circular profile of the central portion 130. The circular profile of the central portion 130 and the arcuate profile of each one of the outer portions 135a-135d are concentric to the center 133 of the rotor 126. Each of the outer portions 135a-135d includes a respective inner surface 136a-136d and outer surface 137a-137d. The inner surface 136a-136d and the outer surface 137a-137d of each respective outer portion 135a-135d are arcuate and extend between a pair of curved end surfaces 139. The inner surfaces 136a-136d define an outer circumferential perimeter 142 in the X-Z plane. Each of the outer portions 135a-135d includes a first planar surface 144a-144d and a second planar surface disposed in the X-Z plane (the second planar surface 190d of the fourth outer portion 135d and the second planar surface 190c of the third outer portion 135c are illustrated in FIG. 1D). The first planar surface 144a-144d is separated from the second planar surface of each outer portion 135a-135d by the respective inner surfaces 136a-136d, outer surfaces 137a-137d, and curved end surfaces 139. The second planar surface of each portion 135a-135d faces an inner surface 145 of the motor housing 112 and the first planar surface 144a-144d of each outer portion 135a-135d faces away from the inner surface 145.

The rotor 126 includes a plurality of connector portions 140a-140d disposed between the central portion 130 and the outer portions 135a-135d. The connector portions 140a-140d protrude radially outward from the outer surface 132 of the central portion 130 and to the outer portions 135a-135d. The connector portions 140a-140d protrude radially outward relative to the center 133 of the rotor 126.

The rotor 126 includes a first plurality of electrical coils 146a wound at least partially around the first outer portion 135a, and a second plurality of electrical coils 146b wound at least partially around the second outer portion 135b. The rotor 126 includes a third plurality of electrical coils 146c wound at least partially around the third outer portion 135c, and a fourth plurality of electrical coils 146d wound at least partially around the fourth outer portion 135d. In one example, the pluralities of electrical coils 146a-146d are wound around the inner surface 136a-136d, the outer surface 137a-137d, the first planar surface 144a-144d, and the second planar surface of each respective outer portion 135a-135d. Portions of the electrical coils 146a-146d are disposed between the inner surface 145 of the motor housing 112 and the second planar surfaces of the outer portions 135a-135d.

The electrical coils 146a-146d comprise copper wiring and are connected to an electrical source that supplies electrical current to the electrical coils 146a-146d. The electrical coils 146a-146d are powered by flowing an electrical current through the electrical coils 146a-146d. In one example, the electrical current is alternating current (AC). The present disclosure contemplates that direct current (DC) may also be used.

The first plurality of electrical coils 146a are wound around the first outer portion 135a of the rotor 126 such that, when powered, electrical current flows through the first plurality of electrical coils 146a and about the first outer portion 135a in a first rotational direction. The second plurality of electrical coils 146b are wound around the second outer portion 135b of the rotor 126 such that, when powered, electrical current flows through the second plurality if electrical coils 146b and about the second outer portion 135b in a second rotational direction. The second rotational direction may be opposite of the first rotational direction.

The third plurality of electrical coils 146c are wound around the third outer portion 135c of the rotor 126 such that, when powered, electrical current flows through the third plurality of electrical coils 146c and about the third outer portion 135c in a third rotational direction. The fourth plurality of electrical coils 146d are wound around the fourth outer portion 135d of the rotor 126 such that, when powered, electrical current flows through the fourth plurality if electrical coils 146d and about the fourth outer portion 135d in a fourth rotational direction. The third rotational direction may be opposite of the fourth rotational direction.

Electrical current is supplied through the electrical coils 146a-146d to generate magnetic fields, which in conjunction with magnetic fields of magnets 152a-152d of stator 151 cause the rotor to 126 to rotate as further described below.

The motor 110 includes a stator 151 disposed radially outside of the rotor 126 relative to the center 133 of the rotor 126. The stator 151 includes one or more magnets 152a-152d (four are shown) disposed radially outside of the outer portions 135a-135d of the rotor 126. The rotor 126 is rotatably movable relative to the magnets 152a-152d of the stator 151. The magnets 152a-152d are mounted to the inner surface 145 of the motor housing 112 using one or more fasteners 153. In one example, each of the magnets 152a-152d is fixed in place. In one example, each of the magnets 152a-152d is a permanent magnet. Although four magnets 152a-152d are shown, the stator 151 may include only one, two, three, four, or more magnets.

Each of the magnets 152a-152d includes a respective inner surface 156a-156d and outer surface 157a-157d. The inner surface 156a-156d and the outer surface 157a-157d of each respective magnet 152a-152d are arcuate and extend between a pair of curved end surfaces 159. Each of the magnets 152a-152d includes a first planar surface 154a-154d and a second planar surface disposed in the X-Z plane. The first planar surface 154a-154d is separated from the second planar surface of each magnet 152a-152d by the respective inner surfaces 156a-156d, outer surfaces 157a-157d, and curved end surfaces 159. The second planar surface of each magnet 152a-152d faces the inner surface 145 of the motor housing 112 and the first planar surface 154a-154d of each magnet 152a-152d faces away from the inner surface 145.

In one embodiment, which can be combined with other embodiments, electrical current is supplied through the first plurality of coils 146a to generate a magnetic field that is drawn to one or more of the magnets 152a-152d of the stator 151, thereby generating a first magnetic force 150a that moves the first outer portion 135a of the rotor 126. In one embodiment, which can be combined with other embodiments, electrical current is supplied through the first plurality of coils 146a to generate a magnetic field that is repelled by one or more of the magnets 152a-152d of the stator 151, thereby generating the first magnetic force 150a that moves the first outer portion 135a of the rotor 126. The first magnetic force 150a may be generated by a combination of being drawn to one or more of the magnets 152a-152d while being repelled by one or more of the other magnets 152a-152d. The first magnetic force 150a causes the rotor 126 to rotate, which in turn rotates the drive shaft 128 and the crankshaft 124. In a similar manner, electrical current can be supplied to the second, third, and/or fourth plurality of coils 146b, 146c, and 146d relative to one or more of the magnets 152a-152d to generate second, third, and/or fourth magnetic forces 150b, 150c, and 150d. As shown in FIG. 1B, the first magnetic force 150a is oriented in a direction that is opposite of a direction in which the second magnetic force 150b is oriented. As shown in FIG. 1B, the first magnetic force 150a is oriented in a direction that is opposite of a direction in which the second magnetic force 150b is oriented when viewed in the X-Z plane. As shown in FIG. 1B, the third magnetic force 150c is oriented in a direction that is opposite of a direction in which the fourth magnetic force 150d is oriented when viewed in the X-Z plane. The rotor 126 is shown as being rotated in the counter-clockwise direction by the magnetic forces 150a-150d, but can alternatively be configured to be rotated in the clockwise direction by direction in which electric current is flowed through the plurality of coils 146a-146d and/or by placement or type of magnets 152a-152d used.

In one embodiment, which can be combined with other embodiments, the pair of first and second pluralities of electrical coils 146a, 146b, and the pair of third and fourth pluralities of electrical coils 146c, 146d are powered sequentially. In one example, the first and second pluralities of electrical coils 146a, 146b are powered and the third and fourth pluralities of electrical coils 146c, 146d are unpowered when the first and second outer portions 135a, 135b are adjacent the first and second magnets 152a, 152b respectively. As the rotor 126 rotates, the third and fourth pluralities of electrical coils 146c, 146d are powered and the first and second pluralities of electrical coils 146a, 146b are unpowered when the third and fourth outer portions 135c, 135d are adjacent the third and fourth magnets 152c, 152d respectively. Electric current may be flowed through any one of the electrical coils 146a-146d in the same or opposite direction (and/or at the same or different times) as electric current that is flowed through any other one of the electrical coils 146a-146d.

Electrical current, when powered, flows through the electrical coils 146a-146d to generate the magnetic forces 150a-150d in a clockwise fashion or counter-clockwise fashion about the center 133 of the rotor 126 (FIG. 1B illustrates the counter-clockwise fashion about the center 133). The magnetic forces 150a-150d are applied directly to the respective outer portions 135a-135d of the rotor 126 to turn the rotor 126 using the electrical coils 146a-146d, when powered with electrical current. The turning of the rotor 126 using the magnetic forces 150a-150d turns the drive shaft 128 of the crankshaft 124 using the direct coupling of the rotor 126 to the drive shaft 128.

The aspects of the power end 100 facilitate eliminating parts from power ends, such as gears or gearboxes disposed between a prime mover (such as a diesel engine) and a crankshaft. Gears and gearboxes may be eliminated, for example, because the magnetic forces 150a-150d apply directly to the outer portions 135a-135d of the rotor 126 that is directly coupled to the drive shaft 128 to turn the crankshaft 124. The reduced number of parts facilitates reduced costs such as maintenance and assembly costs, and reduced weight of the power end 100. The reduced number of parts also facilitates reduced volume, meaning the power end 100 takes up less space as part of a frac pump, such as on a frac truck or frac trailer. Applying the magnetic forces 150a-150d directly to the rotor 126 directly coupled to the drive shaft 128 generates more torque and power for the crankshaft 124 due to less mechanical losses from components (such as gears) could otherwise be present between the a crankshaft and a prime mover.

Figure 1C:
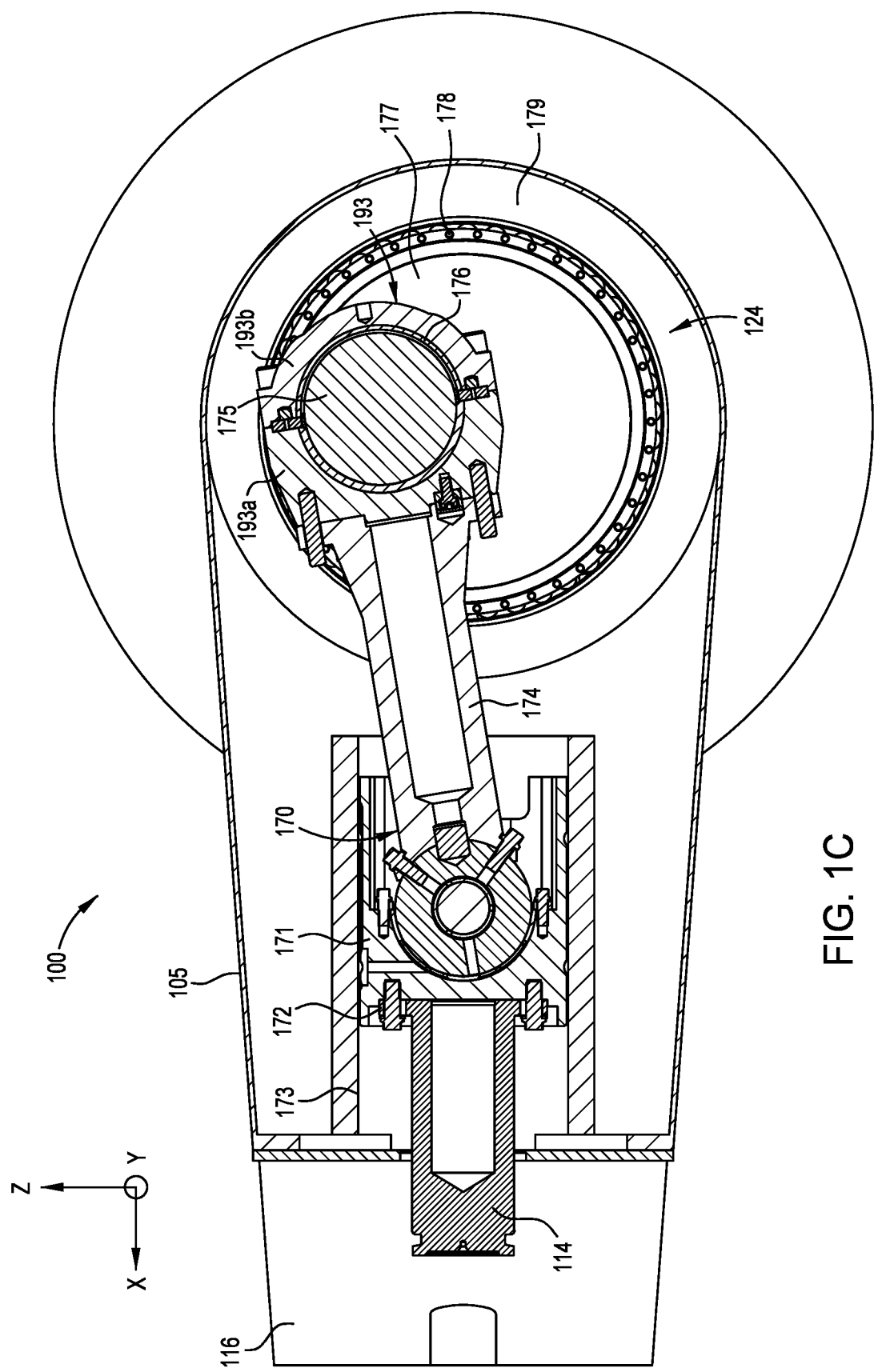
FIG. 1C is a schematic cross sectional view of the power end illustrated in FIG. 1A, taken along lines 1C-1C, according to one implementation.
Figure 1D:
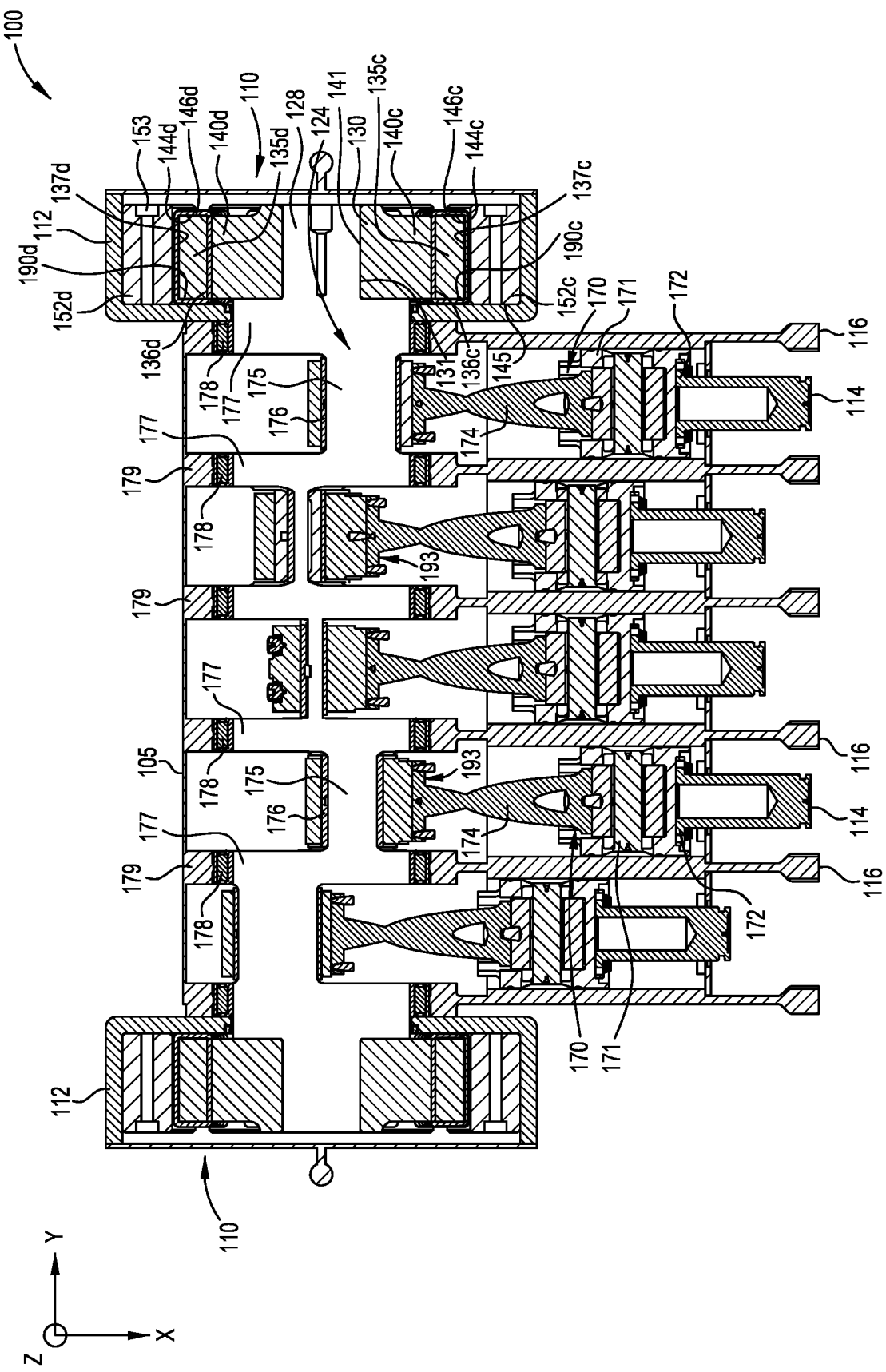
FIG. 1D is a schematic cross sectional view of the power end illustrated in FIG. 1A, taken along lines 1D-1D, according to one implementation.

FIG. 1C is a schematic cross sectional view of the power end 100 illustrated in FIG. 1A, taken along lines 1C-1C, according to one implementation. A head 172 of each actuation rod 114 is coupled to a head 171 of a piston 170 (a plurality of pistons 170 may be included in the power end 100). The head 172 of the actuation rod 114 and the head 171 of the piston 170 are movably disposed in a cylinder 173 formed in the power end body 105. Each piston 170 includes a connecting rod 174. The connecting rod 174 includes a first end coupled to the head 171 and a second end coupled to a clamp 193. The clamp 193 is disposed around a journal 175 of the crankshaft 124. The clamp 193 includes a first portion 193a coupled to a second portion 193b. The clamp 193 is coupled to a body, such as an elongated body, of the connecting rod 174. As the crankshaft 124 is turned by the rotor 126, the journal 175 moves in a rotational fashion. Movement of the journal 175 moves the head 171 of the piston 170 and the head 172 of the actuation rod 114 translationally within the cylinder 173. A bearing 176 may be disposed between the clamp 193 and the journal 175. The translational movement of the actuation rod 114 actuates the pony rods 118 to actuate the plungers 122 of the fluid end 120.

FIG. 1D is a schematic cross sectional view of the power end 100 illustrated in FIG. 1A, taken along lines 1D-1D, according to one implementation. The crankshaft 124 includes a plurality of journals 175 and a plurality of webs 177. Each journal 175 is disposed between two of the webs 177. Each piston 170 includes a connecting rod 174 and a clamp 193 disposed around each respective journal 175. One or more bearings 178 are disposed between each web 177 and a respective protrusion 179 that protrudes inwardly from an inner surface of the power end body 105. The protrusions 179 may be integrally formed with the power end body 105 to form a single unitary and monolithic body. The webs 177 include an outer diameter that is larger than an outer diameter of the journals 175. As discussed above, as the magnetic forces 150a-150d turn the rotor 126 and the drive shaft 128, the journals 175 and the webs 177 of the crankshaft 124 turn to rotate in the same rotational direction as the rotor 126 and the drive shaft 128. The movement of the journals 175 along a rotational path translates the pistons 170 and the actuation rods 114.

Benefits of the present disclosure include efficiently and effectively driving a power end to power a fluid end; increased power efficiency of power ends; weight savings; cost savings including assembly costs and maintenance costs; space savings; and increased power and torque generation.

Aspects of the present disclosure include a power end; a stator having one or more magnets; a rotatable rotor having a central portion, a plurality of connector portions, and a plurality of outer portions; a first, second, third, and fourth plurality of electrical coils. It is contemplated that one or more of these aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

I claim:

1. A power end for a pump, the power end comprising:
a crankshaft coupled to a plurality of actuation rods; and
a motor, the motor comprising:
a rotor coupled to the crankshaft, the rotor comprising:

a central portion,
a plurality of outer portions disposed radially outside of the central portion,
a plurality of connector portions that protrude radially outward from the central portion and to the plurality of outer portions, respectively, and
a plurality of electrical coils wound at least partially around the plurality of outer portions, and
a stator disposed radially outside the rotor, the stator comprising one or more magnets, wherein the plurality of electrical coils apply a magnetic force to the rotor to turn the crankshaft when the plurality of electrical coils are powered.

2. The power end of claim 1, wherein the plurality of electrical coils are powered by flowing an electrical current through the plurality of electrical coils to generate the magnetic force, which is drawn to or repelled by one or more of the magnets to rotate the rotor and turn the crankshaft.

3. The power end of claim 2, wherein the rotor is coupled to a drive shaft of the crankshaft.

4. The power end of claim 3, wherein each actuation rod of the plurality of actuation rods is coupled to a journal of the crankshaft through a connecting rod of a piston, the journal being disposed between two webs of the crankshaft.

5. The power end of claim 3, further comprising a locking member disposed between the drive shaft and the rotor to rotationally couple the drive shaft and the rotor together.

6. The power end of claim 1, wherein the motor is disposed in a motor housing, and the one or more magnets of the stator are fastened to the motor housing.

7. A power end for a pump, the power end comprising:
a crankshaft coupled to a plurality of actuation rods; and
a motor, the motor comprising:
a rotor coupled to the crankshaft, the rotor comprising:
a central portion,
a first portion disposed on a first side of a center of the rotor, the first portion comprising a first plurality of electrical coils wound at least partially around the first portion,
a second portion disposed on a second side of the center of the rotor, the second portion comprising a second plurality of electrical coils wound at least partially around the second portion, each of the first portion and the second portion disposed radially outside of the central portion, and
a plurality of connector portions that protrude radially outward from the central portion and to the first portion and the second portion, respectively, and
a stator disposed radially outside of the rotor, the stator comprising one or more magnets, wherein the first plurality of electrical coils generate a first magnetic force drawn to at least one of the one or more magnets in a first direction when powered, wherein the second plurality of electrical coils generate a second magnetic force drawn to at least one of the one or more magnets in a second direction when powered, the second direction being opposite of the first direction.

8. The power end of claim 7, wherein the first plurality of electrical coils are powered by flowing electrical current through the first plurality of electrical coils in a first direction, and the second plurality of electrical coils are powered by flowing electrical current through the second plurality of electrical coils in a second direction.

9. The power end of claim 8, wherein the second direction is opposite of the first direction.

10. The power end of claim 8, wherein each of the electrical current flowing through the first plurality of electrical coils and the electrical current flowing through the second plurality of electrical coils is alternating current.

11. The power end of claim 7, wherein the rotor further comprises:
a third portion disposed on a third side of the center of the rotor, the third portion comprising a third plurality of electrical coils wound at least partially around the third portion; and
a fourth portion disposed on a fourth side of the center of the rotor, the fourth portion comprising a fourth plurality of electrical coils wound at least partially around the fourth portion.

12. The power end of claim 7, wherein the motor is disposed in a motor housing, and the one or more magnets of the stator are fastened to the motor housing.

13. The power end of claim 12, further comprising a locking member disposed between the crankshaft and the rotor to rotationally couple the crankshaft and the rotor together.

14. A power end for a pump, the power end comprising:
a crankshaft coupled to a plurality of actuation rods, the crankshaft comprising a drive shaft; and
a motor, the motor comprising:
a rotor coupled to the drive shaft of the crankshaft, the rotor comprising:
a centerline axis extending through a center of the rotor,
a central portion,
a first outer portion disposed on a first side of the center of the rotor, the first outer portion comprising a first plurality of electrical coils wound at least partially around the first outer portion,
a second outer portion disposed on a second side of the center of the rotor, the second outer portion comprising a second plurality of electrical coils wound at least partially around the second outer portion,
a third outer portion disposed on a third side of the center of the rotor, the third outer portion comprising a third plurality of electrical coils wound at least partially around the third outer portion,
a fourth outer portion disposed on a fourth side of the center of the rotor, the fourth outer portion comprising a fourth plurality of electrical coils wound at least partially around the fourth outer portion, each of the first outer portion, the second outer portion, the third outer portion, and the fourth outer portion disposed radially outside of the central portion, and
a plurality of connector portions that protrude radially outward from the central portion and to the first outer portion, the second outer portion, the third outer portion, and the fourth outer portion, respectively, and
a stator disposed radially outside of the rotor relative to the center of the rotor, the stator comprising one or more magnets,
wherein the first outer portion, the second outer portion, the third outer portion, and the fourth outer portion of the rotor define an inner circumferential perimeter, and the drive shaft defines an outer circumferential perimeter, the outer circumferential perimeter being within the inner circumferential perimeter.

15. The power end of claim 14, wherein the central portion of the rotor is circular and comprises a central opening and an inner surface that interfaces with the drive shaft of the crankshaft.

16. The power end of claim 15, wherein each of the first outer portion, the second outer portion, the third outer portion, and the fourth outer portion of the rotor is arcuate and disposed concentrically about the central portion.

17. The power end of claim 16, wherein each of the first outer portion, the second outer portion, the third outer portion, and the fourth outer portion of the rotor comprises:
- a pair of curved end surfaces;
- an arcuate inner surface between the pair of curved end surfaces, the arcuate inner surfaces of the first outer portion, the second outer portion, the third outer portion, and the fourth outer portion defining the inner circumferential perimeter;
- an arcuate outer surface between the pair of curved end surfaces; and
- an arcuate profile concentric to a circular profile of the central portion.

18. The power end of claim 17, wherein the motor is disposed in a motor housing, and the one or more magnets of the stator are fastened to the motor housing.

19. The power end of claim 17, wherein each of the first outer portion, the second outer portion, the third outer portion, and the fourth outer portion of the rotor further comprises:
- a first planar surface; and
- a second planar surface separated from the first planar surface by the pair of curved end surfaces, the arcuate inner surface, and the arcuate outer surface.

20. The power end of claim 19, wherein centers of the first, second, third, and fourth outer portions are spaced about 90 degrees equidistantly from each other about the center.

* * * * *